United States Patent
Mehra et al.

(10) Patent No.: US 10,474,498 B2
(45) Date of Patent: Nov. 12, 2019

(54) SERVER SCHEDULING TOOL

(71) Applicant: BANK OF AMERICA CORPORATION, Charlotte, NC (US)

(72) Inventors: Shekhar Singh Mehra, New Delhi (IN); Gaurav Bansal, Hyderabad (IN); Pinak Chakraborty, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 140 days.

(21) Appl. No.: 15/903,263

(22) Filed: Feb. 23, 2018

(65) Prior Publication Data

US 2019/0266020 A1  Aug. 29, 2019

(51) Int. Cl.
  *G06F 9/46* (2006.01)
  *G06F 9/48* (2006.01)
  *G06F 9/50* (2006.01)

(52) U.S. Cl.
  CPC ............ *G06F 9/4887* (2013.01); *G06F 9/468* (2013.01); *G06F 9/5038* (2013.01)

(58) Field of Classification Search
  None
  See application file for complete search history.

(56) References Cited

U.S. PATENT DOCUMENTS

| | | |
|---|---|---|
| 7,302,450 B2 | 11/2007 | Benedetti |
| 8,091,087 B2 | 1/2012 | Ali et al. |
| 9,442,760 B2 | 9/2016 | Boutin et al. |
| 9,612,878 B2 | 4/2017 | Di Balsamo et al. |
| 9,740,522 B2 | 8/2017 | Schmidt et al. |

*Primary Examiner* — Gregory A Kessler
(74) *Attorney, Agent, or Firm* — Michael A. Springs

(57) ABSTRACT

An apparatus includes a memory and a hardware processor. The memory stores one or more scheduling histories. The processor receives a first list from a first client device and a second list from a second client device. The first list includes a first job and the second list includes a second job. The processor calculates a first resource requirement to execute the first job and a second resource requirement to execute the second job. The processor determines that a conflict exists between the first job and the second job and in response, communicates messages to the first and second client devices indicating the conflict and proposed times for executing the jobs. The processor determines based on responses to the messages, execution times for the first and second jobs, assigns permission identifiers to the first and second jobs, and communicates a schedule.

21 Claims, 6 Drawing Sheets

SERVER SCHEDULING TOOL

TECHNICAL FIELD

This disclosure relates generally to scheduling jobs on a server.

BACKGROUND

Computers are used ubiquitously throughout organizations by members and employees. The computers may request that one or more servers execute jobs.

SUMMARY OF THE DISCLOSURE

Servers are used to execute jobs from client devices. Sometimes, the jobs are requested to be executed at a later, scheduled time (e.g., overnight). When a client schedules a job with the server, the client and the server may not know how much load the server will be experiencing at the time the job is scheduled to execute. If the server does not have sufficient resources at execution time, the job may fail or never execute.

This disclosure contemplates an unconventional server scheduling tool that performs a scheduling process that increases the likelihood that the sever will have sufficient resources at execution time. The scheduling tool receives lists of jobs to be scheduled from multiple client devices. The server calculates, based on historical data, the resource requirements for each job. Then, the server uses these calculated resource requirements to schedule the jobs such that the server is not overloaded. If there is a conflict (e.g., two jobs are requested to execute at the same time but simultaneous execution would overload the server), the server proposes new times to the clients that requested the two jobs. If a conflict persists, the scheduling tool requests additional resources from the cloud to be available at the requested execution time. After the execution times are set, the scheduling tool assigns permission identifiers to each job.

Around execution time, each client will first validate that the server has sufficient resources to execute the job. If the server has sufficient resources, a client will request that a job be executed according to the schedule. The request also includes the permission identifier assigned to the job to prevent a client from requesting an unscheduled job. Three embodiments of the scheduling tool are described below.

According to an embodiment, a server scheduling tool includes a memory and a hardware processor. The memory stores one or more scheduling histories. The hardware processor receives a first list from a first client device. The first list includes a first job. The hardware processor also receives a second list from a second client device. The second list includes a second job. The hardware processor further calculates, based on the one or more scheduling histories, a first resource requirement to execute the first job and calculates, based on the one or more scheduling histories, a second resource requirement to execute the second job. The hardware processor also determines, based on the first resource requirement and the second resource requirement, that a conflict exists between the first job and the second job and in response, communicates a first message to the first client device indicating the conflict and a first proposed time for executing the first job and communicates a second message to the second client device indicating the conflict and a second proposed time for executing the second job. The hardware processor further determines based on responses to the first message and the second message a first execution time for the first job and a second execution time for the second job, assigns a first permission identifier to the first job, assigns a second permission identifier to the first job, and communicates a schedule indicating that the first job will execute at the first execution time, that the second job will execute at the second execution time, that the first job is assigned the first permission identifier, and that the second job is assigned the second permission identifier.

According to another embodiment, a method includes storing, by a memory, one or more scheduling histories and receiving, by a hardware processor communicatively coupled to the memory, a first list from a first client device. The first list includes a first job. The method also includes receiving, by the hardware processor, a second list from a second client device. The second list includes a second job. The method further includes calculating, by the hardware processor, based on the one or more scheduling histories, a first resource requirement to execute the first job and calculating, by the hardware processor, based on the one or more scheduling histories, a second resource requirement to execute the second job. The method also includes determining, by the hardware processor, based on the first resource requirement and the second resource requirement, that a conflict exists between the first job and the second job and in response, communicating, by the hardware processor, a first message to the first client device indicating the conflict and a first proposed time for executing the first job and communicating, by the hardware processor, a second message to the second client device indicating the conflict and a second proposed time for executing the second job. The method also includes determining, by the hardware processor, based on responses to the first message and the second message a first execution time for the first job and a second execution time for the second job, assigning, by the hardware processor, a first permission identifier to the first job, assigning, by the hardware processor, a second permission identifier to the second job, and communicating, by the hardware processor, a schedule indicating that the first job will execute at the first execution time, that the second job will execute at the second execution time, that the first job is assigned the first permission identifier, and that the second job is assigned the second permission identifier.

According to yet another embodiment, a system includes a first client device, a second client device, and a server scheduling tool. The server scheduling tool stores one or more scheduling histories and receives a first list from the first client device. The first list includes a first job. The server scheduling tool also receives a second list from the second client device. The second list includes a second job. The server scheduling tool further calculates, based on the one or more scheduling histories, a first resource requirement to execute the first job and calculates, based on the one or more scheduling histories, a second resource requirement to execute the second job. The server scheduling tool also determines, based on the first resource requirement and the second resource requirement, that a conflict exists between the first job and the second job and in response, communicates a first message to the first client device indicating the conflict and a first proposed time for executing the first job and communicates a second message to the second client device indicating the conflict and a second proposed time for executing the second job. The server scheduling tool further determines based on responses to the first message and the second message a first execution time for the first job and a second execution time for the second job, assigns a first permission identifier to the first job, assigns a second permission identifier to the second job, and communicates a schedule indicating that the first job will execute at the first execution time, that the second job will execute at the second execution time, that the first job is assigned the first permission identifier, and that the second job is assigned the second permission identifier.

Certain embodiments provide one or more technical advantages. For example, an embodiment ensures that a server has sufficient resources to execute a job when the job is scheduled. As another example, an embodiment prevents client devices from executing unscheduled jobs, thus reducing the risk that a server will be overloaded. As yet another example, an embodiment allows maximum usage of server resources by ensuring that executed jobs do not overload a server. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
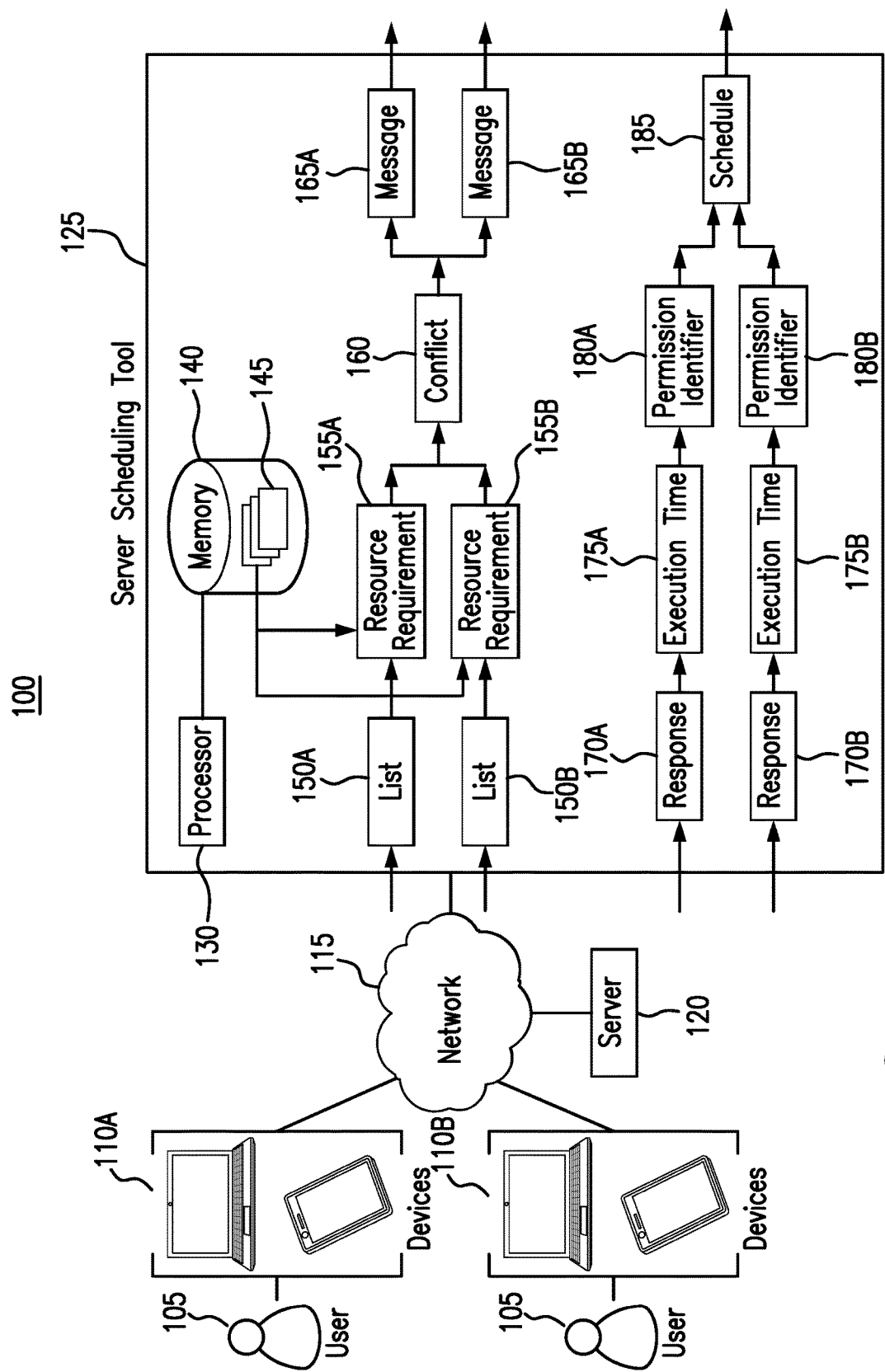
FIG. 1 illustrates a system for scheduling server jobs.
Figure 2A:
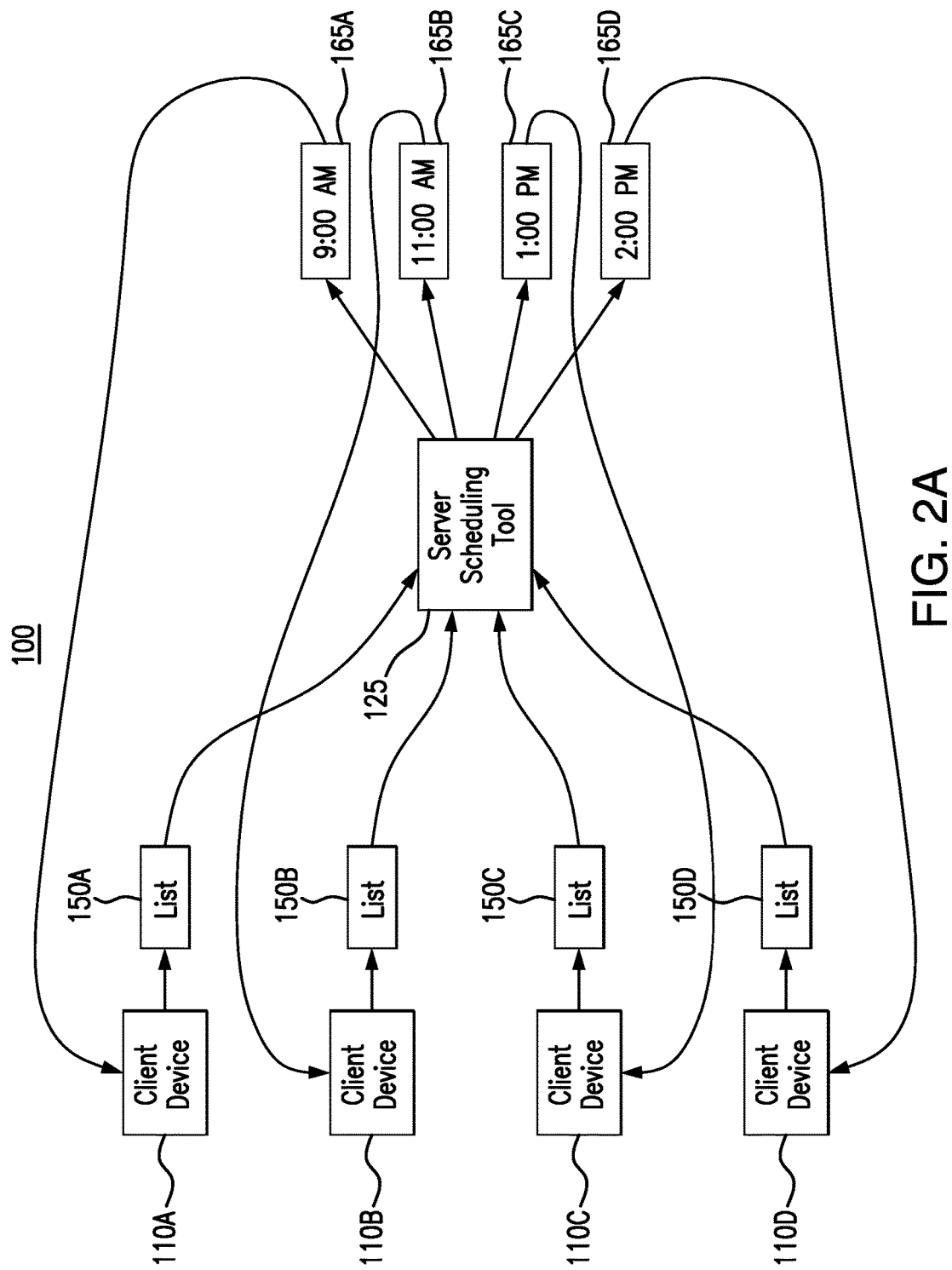
FIGS. 2A-2C illustrate an example operation of the system of FIG. 1.
Figure 2B:
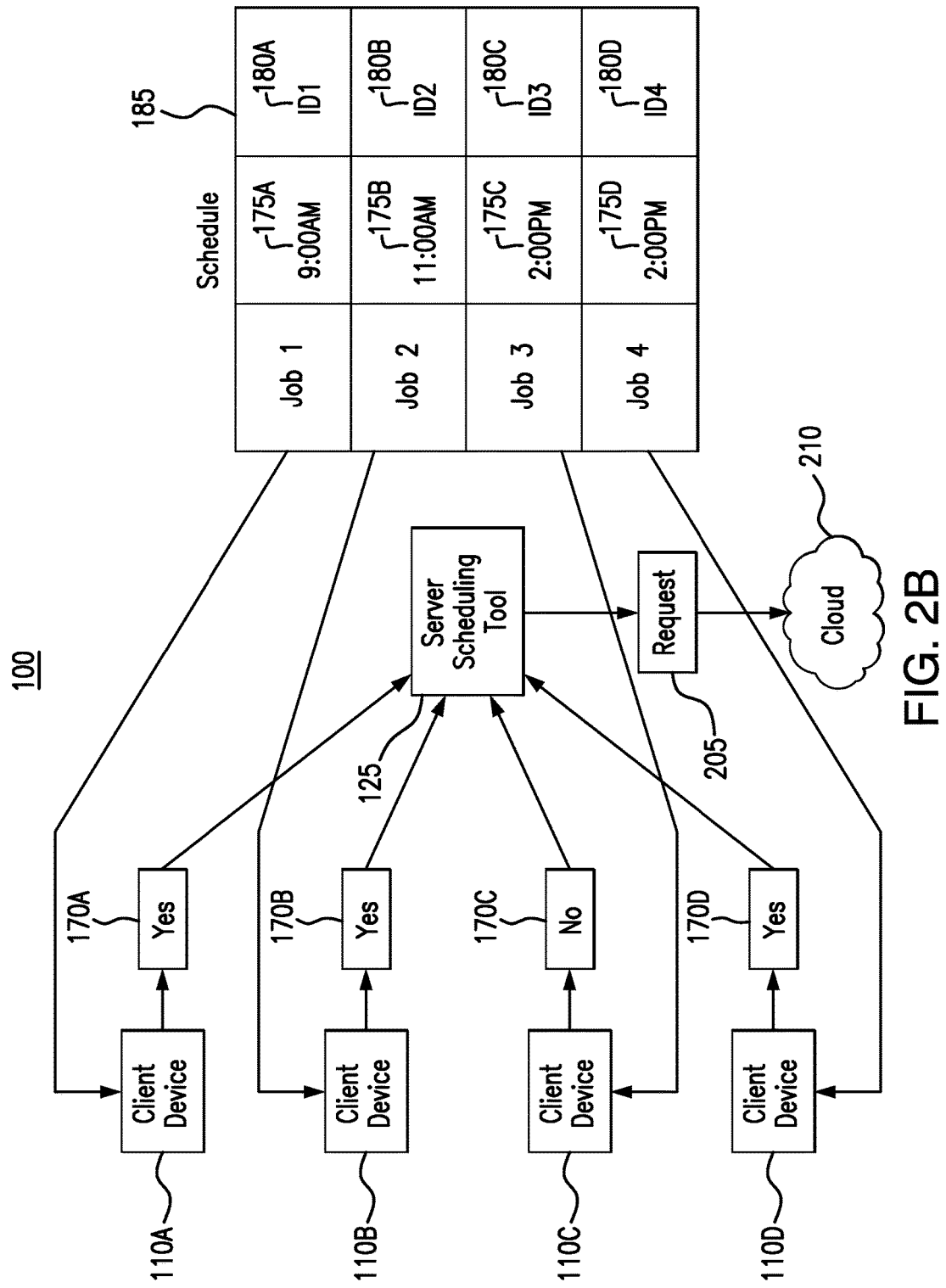
Figure 2C:
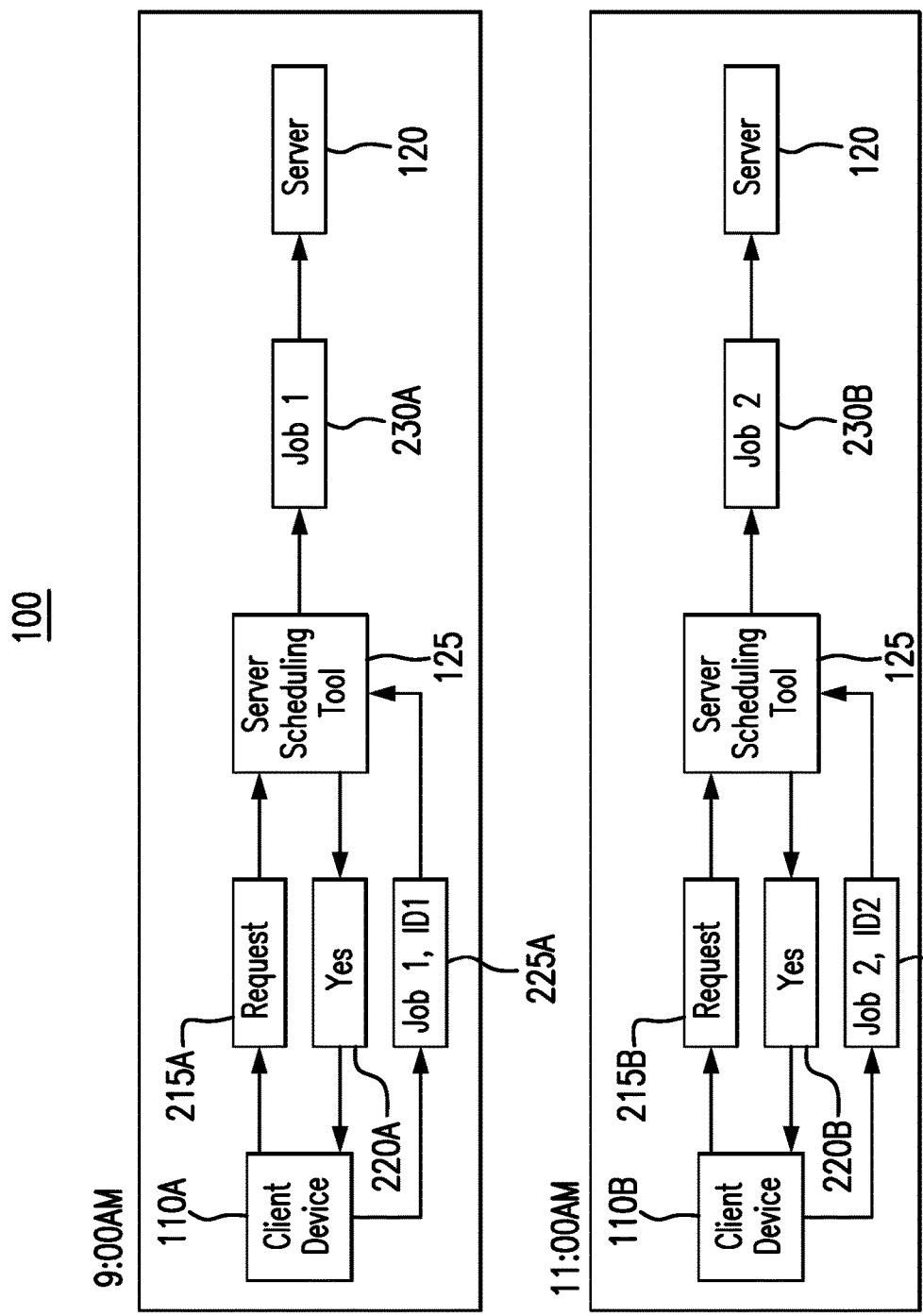
Figure 2C:
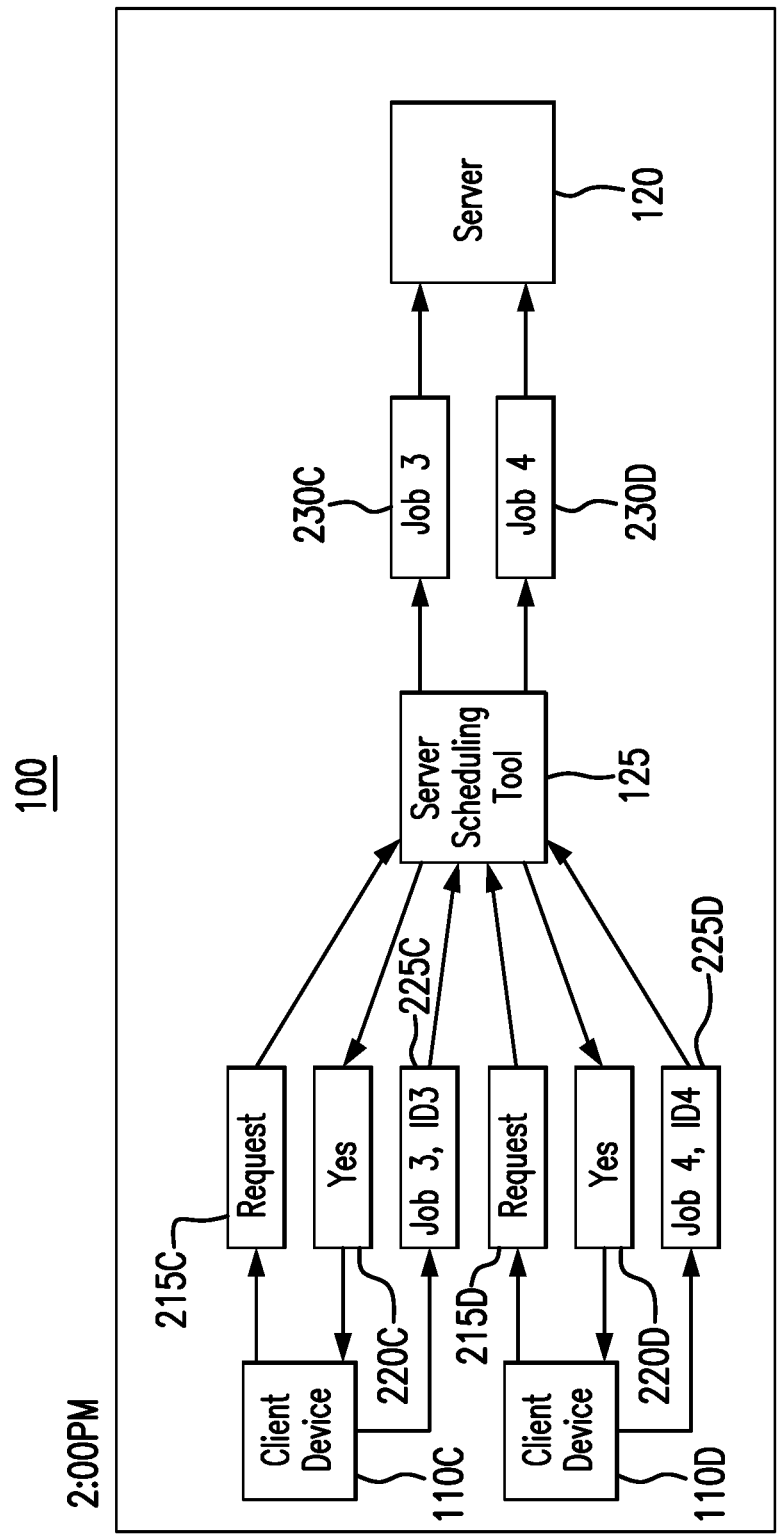
Figure 3:
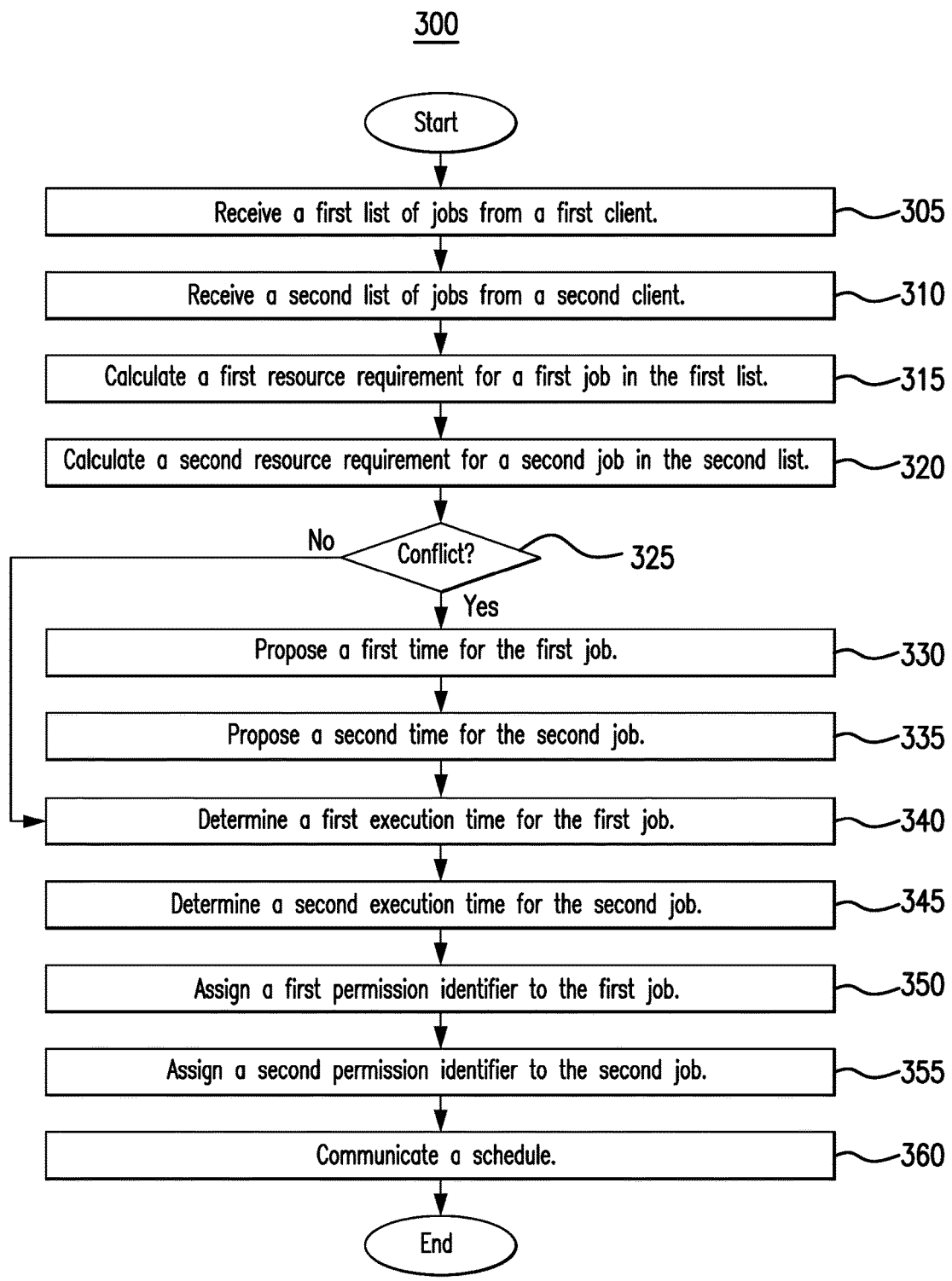
FIG. 3 is a flowchart illustrating a method for scheduling jobs using the system of FIG. 1.

Embodiments of the present disclosure and its advantages are best understood by referring to FIGS. 1 through 3 of the drawings, like numerals being used for like and corresponding parts of the various drawings.

Servers are used to execute jobs from client devices. Sometimes, the jobs are requested to be executed at a later, scheduled time (e.g., overnight). When a client schedules a job with the server, the client and the server may not know how much load the server will be experiencing at the time the job is scheduled to execute. If the server does not have sufficient resources at execution time, the job may fail or never execute. A user may not discover that a schedule job did not execute until the user returns the next day, thus resulting in lost time and resources.

This disclosure contemplates an unconventional server scheduling tool that performs a scheduling process that increases the likelihood that the sever will have sufficient resources at execution time. The scheduling tool receives lists of jobs to be scheduled from multiple client devices. The server calculates, based on historical data, the resource requirements for each job. Then, the server uses these calculated resource requirements to schedule the jobs such that the server is not overloaded. If there is a conflict (e.g., two jobs are requested to execute at the same time but simultaneous execution would overload the server), the server proposes new times to the clients that requested the two jobs. If a conflict persists, the scheduling tool requests additional resources from the cloud to be available at the requested execution time. After the execution times are set, the scheduling tool assigns permission identifiers to each job.

Around execution time, each client will first validate that the server has sufficient resources to execute the job. If the server has sufficient resources, a client will request that a job be executed according to the schedule. The request also includes the permission identifier assigned to the job to prevent a client from requesting an unscheduled job. Three embodiments of the scheduling tool are described below.

In certain embodiments, the server scheduling tool ensures that a server has sufficient resources to execute a job when the job is scheduled. The server scheduling tool also prevents client devices from executing unscheduled jobs, thus reducing the risk that a server will be overloaded. In this manner, the server scheduling tool allows maximum usage of server resources by ensuring that executed jobs do not overload a server. The server scheduling tool will be described generally using FIGS. 1 and 2A-2C. FIG. 3 will show a process for operating the server scheduling tool.

FIG. 1 illustrates a system 100 for scheduling server jobs. As shown in FIG. 1, system 100 includes one or more devices 110, a network 115, a server 120, and a server scheduling tool 125. In certain embodiments, system 100 reduces the chances that a job fails to execute on server 120 by ensuring that server 120 has sufficient system resources to execute the job when the job is scheduled.

Devices 110 are used by users 105 to schedule jobs on server 120. For example, users 105 can use devices 110 to communicate one or more lists 150 to server scheduling tool 125. Each list 150 indicates one or more jobs to be scheduled for execution on server 120. Each list 150 can also indicate a desired start time for each job and/or a desired completion time for each job. Server scheduling tool 125 attempts to schedule the jobs identified in each list 150. Devices 110 may be referred to as clients and/or client devices.

Devices 110 may be any appropriate device for communicating with components of system 100 over network 115. For example, devices 110 may be a telephone, a mobile phone, a computer, a laptop, a tablet and/or an automated assistant. This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Server 120 executes jobs to achieve certain goals or to perform certain tasks desired by users 105. These jobs are typically scheduled to execute at subsequent times on server 120. In some instances, server 120 may have insufficient system resources to execute a scheduled job when that job is scheduled to execute. For example, a first job executing on server 120 may be delayed. As a result, the execution of the first job may run into the execution time for a second job. When the second job begins executing, it may attempt to consume system resources that are not available on server 120 because the first job is still executing. As a result, the second job fails to execute on server 120. In existing systems, a user 105 that scheduled the second job may not know that the second job has failed to execute until the user returns the next day to review the results of the job. As a result, the user has lost time and resources because the second job failed to execute and because the user was not aware of the failed execution until later.

This disclosure contemplates an unconventional server scheduling tool 125 that reduces the chances that a scheduled job fails to execute. The server scheduling tool 125 ensures that the server 120 has sufficient system resources to execute a job when that job is scheduled in certain embodiments. This disclosure contemplates server 120 and server scheduling tool 125 being separate devices or integrated devices. For example, server scheduling tool 125 may be a component of server 120. As another example, server scheduling tool 125 may be a separate device from server 120. As shown in FIG. 1, server scheduling tool 125 includes a processor 130 and a memory 140. Processor 130 and memory 140 are configured to perform any of the tasks of server scheduling tool 125 discussed herein.

Processor 130 is any electronic circuitry, including, but not limited to microprocessors, application specific integrated circuits (ASIC), application specific instruction set processor (ASIP), and/or state machines, that communicatively couples to memory 140 and controls the operation of server scheduling tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of server scheduling tool 125 by processing information received from network 115, device(s) 110, and memory 140. Processor 130 may be a programmable logic device, a microcontroller, a microprocessor, any suitable processing device, or any suitable combination of the preceding. Processor 130 is not limited to a single processing device and may encompass multiple processing devices.

Memory 140 may store, either permanently or temporarily, data, operational software, or other information for processor 130. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 130 to perform one or more of the functions described herein.

Server scheduling tool 125 receives one or more lists 150 from devices 110. In the illustrated example of FIG. 1, server scheduling tool 125 receives a first list 150A from client device 110A and a second list 150B from devices 110B. Each list 150 identifies one or more jobs that are to be scheduled. For example, list 150A includes one or more jobs that a user 105 of device 110A wants to be scheduled. As another example, list 150B includes one or more jobs that a user 105 of device 110B desires to be scheduled. Devices 110 communicate the list 150 to server scheduling tool 125.

Server scheduling tool 125 stores one or more scheduling histories 145 in memory 140. Scheduling histories 145 indicate previous schedulings of jobs. In some embodiments, scheduling histories 145 also indicates the execution times and durations of these jobs as well as the system resources consumed by the jobs when they were executed by server 120. By using scheduling histories 145, server scheduling tool 125 can approximate and/or estimate the system resources that a job will consume in the future.

Server scheduling tool 125 determines a resource requirement 155 for a job included in lists 150 using the one or more scheduling histories 145. For example, server scheduling tool 125 can examine scheduling histories 145 and determine that a job in list 150 had been previously scheduled and executed. As a result, server scheduling tool 125 can also determine that the previous execution of the job used a certain amount of system resources. Server scheduling tool 125 can then determine that the job will use a similar amount of system resources at its next execution. As a result, server scheduling tool 125 determines resource requirement 155 using the system resources used indicated by scheduling histories 145. In some embodiments, server scheduling tool 125 approximates the resource requirements 155 for a job based on the system resources used by similar jobs indicated in scheduling histories 145. In the illustrated example of FIG. 1, server scheduling tool 125 determines a resource requirement 155A for a job in list 150A using the one or more scheduling histories 145. Server scheduling tool 125 also determines resource requirement 155B for a job in list 150B using the one or more scheduling histories 145.

Server scheduling tool 125 determines whether there is a conflict 160 based on the determined resource requirements 155. For example, server scheduling tool 125 can determine that a job in list 150A and the job in 150B cause conflict 160 because both jobs are scheduled to run at overlapping times and have resource requirements 155 that total more than the system resources available on server 120. When there is a conflict 160, the conflict 160 should be resolved or one or more of the scheduled jobs will fail to execute. If there is no conflict 160, then the job can be scheduled as requested in list 150.

If there is a conflict 160, server scheduling tool 125 proceeds to reschedule the jobs. Server scheduling tool 125 communicates messages 165 to devices 110. Each message 165 proposes a time for scheduling the execution of a job to avoid conflict 160. In the illustrated example of FIG. 1, server scheduling tool 125 communicates a first message 165A to device 110A and a second message 165B to device 110B. Message 165A proposes a new time to execute a job in list 150A. Message 165B proposes a new time to execute a job in list 150B. In some embodiments, server scheduling tool 125 proposes new times based on a priority for the jobs. For example, if there are two conflicting jobs and one job has a higher priority than the other, then server scheduling tool 125 can allow the higher priority job to be scheduled at the originally requested time and propose a new time to the lower priority job. In some embodiments, priority is determined based on job type (e.g., front end application job vs back end application job), resource consumption (e.g., higher resource consumption jobs have higher priority), time (e.g., jobs that take longer to execute are scheduled last), etc. This disclosure contemplates priority being determined in any suitable manner based on any suitable criterion.

When a device 110 receives a message 165, user 105 can review the message 165 and accept and/or decline the newly proposed time. If the user 105 accepts the newly proposed time, then server scheduling tool 125 may schedule the job at the newly proposed time. If the user 105 declines the newly proposed time, then server scheduling tool 125 implements other steps to avoid conflict 160. For example, server scheduling tool 125 can request additional resources from the cloud to be available to server 120 at job execution time so that conflicting jobs can be scheduled to execute at the same time. As another example, server scheduling tool 125 can alert an administrator to manually override the scheduling and/or the conflict 160.

After user 105 accepts or declines the newly proposed time, devices 110 communicate responses 170 back to server scheduling tool 125. Responses 170 indicate whether a newly proposed time was accepted or declined. In the illustrated example of FIG. 1, device 110A communicates a response 170A to server scheduling tool 125. Device 110B communicates a response 170B to server scheduling tool 125.

Based on responses 170, server scheduling tool 125 determines execution times 175 for each job. The execution time 175 is the time at which a job is scheduled to be executed. In the illustrated example of FIG. 1, server scheduling tool 125 determines execution time 175A for a job in list 150A based on response 170A. Server scheduling tool 125 determines an execution time 175B for a job in list 150B based on response 170B. The determined execution time 175A can be a newly proposed time if user 105 accepted the newly proposed time. If user 105 rejected the newly proposed time, server scheduling tool 125 can determine execution time 175 to be an originally requested time in list 150.

After the execution times 175 are determined for each job, server scheduling tool 125 assigns a permission identifier 180 to each job. Permission identifiers 180 are different for each job. Permission identifiers 180 are used when a job is to be executed. A client 110 seeking to kick off execution of a scheduled job should provide the permission identifier 180 assigned to that job or server 120 and/or server scheduling tool 125 will not start the job in certain embodiments. By verifying the permission identifier 180 prior to executing a scheduled job, server scheduling tool 125 ensures that unscheduled jobs are not accidentally requested and executed by server 120.

In the illustrated example of FIG. 1, server scheduling tool 125 assigns permission identifier 180A to a job in list 150A and a permission identifier 180B to a job in list 150B.

Server scheduling tool 125 generates a schedule 185 and communicates schedule 185 to devices 110. Schedule 185 indicates the execution times 175 of each job and the permission identifiers 180 for each job. Devices 110 then follow the schedules to execute jobs at their scheduled execution times 175.

In certain embodiments, server scheduling tool 125 reduces the chances that a scheduled job will fail to execute on server 120 by ensuring that server 120 will have sufficient system resources to execute that job at the scheduled time.

In this manner, server 120 can safely utilize maximum system resources for each job during execution because it has been predetermined that server 120 will have sufficient resources to perform a scheduled job. As a result, server resources are optimally and efficiently used and jobs do not fail in execution.

FIGS. 2A through 2C illustrate an example operation of the system 100 of FIG. 1. For clarity, not all elements of system 100 are illustrated in FIGS. 2A through 2C. Their absence should not be interpreted as their absence or removal from system 100. In the example of FIGS. 2A through 2C, four different jobs from four different client devices 110 are scheduled to be executed by server scheduling tool 125. As will be seen, server scheduling tool 125 schedules the four jobs in a manner that resolves conflicts on server 120 which allows server 120 to execute all the jobs at their scheduled times without fear of overload.

FIG. 2A shows the client devices 110 requesting that the jobs be scheduled. Client device 110A communicates a list 150A to server scheduling tool 125. Client device 110B communicates a list 150B to server scheduling tool 125. Client device 110C communicates a list 150C to server scheduling tool 125. Client device 110D communicates a list 150D to server scheduling tool 125. Each list 150 includes one or more jobs to be scheduled by server scheduling tool 125. Each list 150 also indicates a desired start time for each job in the list 150. For example, list 150A may request that a first job be scheduled at 9 A.M. List 150B may indicate that a second job be scheduled at 9 A.M. List 150C may indicate that a third job be scheduled at 2 P.M. List 150D may indicate that a fourth job be scheduled to execute at 2 P.M.

Server scheduling tool 125 analyzes lists 150 to determine resource requirements 155 needed by each job. In some embodiments, server scheduling tool 125 refers to one or more scheduling histories 145 to determine the resource requirements 155 for each job. Based on these resource requirements and the desired start time, server scheduling tool 125 determines whether there are conflicts 160. For example, server scheduling tool 125 may determine that the first job in list 150A and the second job in list 150B have a conflict. As another example, server scheduling tool 125 may determine that the third job in list 150C and the fourth job in list 150D have a conflict. These jobs may conflict with each other because they have been requested to be executed at the same times. When these jobs execute at the same time, they may consume more system resources than server 120 has available which results in overload. The overload may cause one or more of the jobs to fail to execute.

To resolve the conflict, server scheduling tool 125 proposes new times to client devices 110. Server scheduling tool 125 generates messages 165 and communicates those messages 165 to client devices 110. In the example of FIG. 2A, server scheduling tool 125 communicates a first message 165A to client device 110A. First message 165A proposes a time of 9 A.M. for the first job. Server scheduling tool 125 communicates a second message 165B to second client device 110B. Second message 165B proposes a new time of 11 A.M. for the second job. Server scheduling tool 125 communicates a third message 165C to the third client device 110C. Third message 165C proposes a new time of 1 P.M. for the third job. Server scheduling tool 125 communicates a fourth message 165D to fourth client device 110D. Fourth message 165D proposes a time of 2 P.M. for the fourth job.

In some embodiments, server scheduling tool 125 proposes these times based on a priority of the jobs. For example, server scheduling tool 125 may determine that the first job has a higher priority than the second job. As a result, server scheduling tool 125 proposes a new time for the second job but not the first job. Likewise, server scheduling tool 125 may determine that the fourth job has a higher priority than the third job. As a result, server scheduling tool 125 proposes a new time of 1 P.M. for the third job.

After the client devices 110 receive the messages 165, the client devices 110 can respond whether they accept the proposed times. In the example of FIG. 2B, client device 110A communicates a first response 170A to server scheduling 125. Response 170A indicates that client device 110A has accepted the proposed time of 9 A.M. Client device 110B communicates a response 170B to server scheduling tool 125. Response 170B indicates that client devices 110B accepts the newly proposed time of 11 A.M. Client device 110C communicates a response 170C to server scheduling tool 125. Response 170C indicates that client device 110C rejects the newly proposed time of 1 P.M. Client device 110D communicates response 170D to server scheduling tool 125. Response 170D indicates that client device 110D accepts the proposed time of 2 P.M.

Server scheduling tool 125 reviews responses 170 to determine how to schedule the jobs. For example, because client device 110A and client device 110B both accepted the proposed times for the first and second jobs, server scheduling tool 125 can schedule the first and second jobs at the proposed times of 9 A.M. and 11 A.M. Because client device 110C rejected the proposed time of 1 P.M., server scheduling tool 125 will request additional system resources from the cloud. In the example of FIG. 2B, server scheduling tool 125 communicates a request 205 to cloud 210. Request 205 requests that cloud 210 provide additional system resources to server 120 at the originally desired time of 2 P.M. If cloud 210 can provide those resources to server 120 at 2 P.M., then server scheduling tool 125 will schedule the third job to begin at 2 P.M. In the illustrated example of FIG. 2, cloud 210 responds that it can provide servers 120 with the system resources to execute the third job at 2 P.M. As a result, server scheduling tool 125 scheduled the third job at 2 P.M. Server scheduling tool 125 also scheduled the fourth job to begin at the proposed time of 2 P.M.

Server scheduling tool 125 then generates schedule 185. Schedule 185 indicates an execution time 175 for each job and a permission identifier 180 for each job. In the illustrated example of FIG. 2B, schedule 185 indicates that job one is to execute at 9 A.M. and has a permission identifier ID1. Schedule 185 indicates that job two has an execution time of 11 A.M. and a permission identifier ID2. Schedule 185 indicates that job three has an execution time of 2 P.M. and a permission identifier ID3. Schedule 185 indicates that job four has an execution time of 2 P.M. and a permission identifier ID4. Server scheduling tool 125 communicates schedule 185 to each client device 110.

Client devices 110 then follow the schedule 185 to request execution of the jobs. At or around 9 A.M., client device 110A communicates a request 215A to server scheduling tool 125. Request 215A requests server scheduling tool 125 to validate that there are sufficient system resources on server 120 to execute the first job. Server scheduling tool 125 then communicates a response 220A to client device 110A. Response 220A indicates that server 120 has sufficient resources available to execute the first job. In response, client device 110A communicates a request 225A to server scheduling tool 125. Request 225A requests that the first job begin execution. Request 225A also includes the permission identifier ID1 for the first job. If request 225A does not indicate the correct permission identifier, then server scheduling tool 125 denies request 225A. When server scheduling tool 125 receives request 225A, server scheduling tool 125 verifies that the correct permission identifier for the first job has been provided. Then server scheduling tool 125 communicates a request 230A to server 120. Request 230A requests that server 120 execute the first job.

At or around 11 A.M., client device 110B communicates a request 215B to server scheduling tool 125. Request 215B requests server scheduling tool 125 to verify that there are sufficient system resources to execute the second job. In this manner, server scheduling tool 125 can verify that the first job was not delayed and therefore still consuming system resources. Server scheduling tool 125 communicates a response 220B to client device 110B indicating whether there are sufficient resources on server 120 to execute the second job. In the illustrated example of FIG. 2C, response 220B indicates that there are sufficient resources to execute the second job. In response, client device 110B communicates a request 225B to server scheduling tool 125. Request 225B requests that job to be executed. Request 225B also indicates the permission identifier ID2 for the second job. If request 225B does not indicate the correct permission identifier, then server scheduling tool 125 denies request 225B. Server scheduling tool 125 verifies that the provided permission identifier is the permission identifier for the second job. Then server scheduling tool 125 communicates a request 230B to server 120. Request 230B requests that the second job be executed by server 120. Server 120 then executes the second job.

At or around 2 P.M., client device 110C communicates a request 215C to server scheduling tool 125. Client device 110D also communicates a request 215D to server scheduling tool 125. Requests 215C and 215D request server scheduling tool 125 to verify that there are sufficient system resources on server 120 to perform the third job and the fourth job. Server 120 may have additional system resources provided through the cloud. Server scheduling tool 125 may determine that there are sufficient resources to perform the third job and the fourth job. Server scheduling tool 125 communicates responses 220C and 220D to client devices 110C and 110D. Responses 220C and 22d indicate that there are sufficient resources on server 120 to execute the third job and the fourth job. In response, client device 110C communicates request 225C to server scheduling tool 125. Client device 110D communicates request 225D to server scheduling tool 125. Requests 225C and 225D request that server scheduling tool 125 execute the third and fourth jobs. Requests 225C and 225D also indicate the permission identifiers ID3 and ID4 for the third and fourth jobs. If requests 225C and 225D do not indicate the correct permission identifiers, then server scheduling tool 125 denies requests 225C and 225D. Server scheduling tool 125 verifies that the appropriate permission identifiers have been provided for the third job and the fourth job. Then server scheduling tool 125 communicates requests 230C and 230D to server 120. Requests 230C and 230D request that server 120 execute the third job and the fourth job. Server 120 then executes the third job and the fourth job.

In the examples of FIGS. 2A through 2C, server scheduling tool 125 ensures that server 120 has sufficient system resources to perform a job before the job is scheduled and before the job is executed. In this manner, the job is less likely to fail during execution. Additionally, server scheduling tool 125 verifies that a correct permission identifier has been provided before the job is executed. In this manner, server scheduling tool 125 ensures that unscheduled jobs are not executed on server 120. As a result, server scheduling tool 125 reduces the number of failed jobs on server 120.

In some embodiments, server scheduling tool 125 determines that an emergency occurs during execution of a job. The emergency can be an event external to the job that will result in failure. For example, the emergency may be a crash on server 120, a power outage, or a network error. In response to the detected emergency, server scheduling tool 125 communicates a suspension message to the client devices 110. The suspension message instructs the devices 110 to stop requesting execution of scheduled jobs. In this manner, server scheduling tool 125 prevents additional job failures from accumulating.

FIG. 3 is a flowchart illustrating a method 300 for scheduling jobs using the system 100 of FIG. 1. In particular embodiments, server scheduling tool 125 performs method 300. By performing method 300, server scheduling tool 125 ensures that a server has sufficient system resources to execute a scheduled job in certain embodiments.

Server scheduling tool 125 begins in step 305 by receiving a first list of jobs from a first client. The first list of jobs includes a first job. In step 310, server scheduling tool 125 receives a second list of jobs from a second client. The second list of jobs includes a second job. Server scheduling tool 125 then calculates a first resource requirement for the first job in the first list in step 315. In step 320, server scheduling tool 125 calculates a second resource requirement for the second job in the second list. In same embodiments, server scheduling tool 125 calculates these resource requirements using scheduling histories stored in server scheduling tool 125. These scheduling histories may indicate the amount of system resources used during the previous executions of the jobs or similar jobs.

In step 325, sever scheduling tool 125 determines whether there is a conflict between the first job and second job. Server scheduling tool 125 determines that there is a conflict when the jobs are scheduled to be executed during the same time and the jobs consume more resources than the server has available.

If server scheduling tool 125 determines that there is a conflict, server scheduling tool 125 proceeds to step 330 to propose a first time for the first job. In step 335, server scheduling tool 125 proposes a second time for the second job. In some embodiments, these proposed times are based on a determined priority for the jobs. For example, server scheduling tool 125 can propose a new time for a job with a lower priority and propose an originally desired time with a higher priority. After server scheduling tool 125 proposes the times, server scheduling 125 may receive responses from the clients indicating whether they accept the proposed times.

If server scheduling tool 125 determines that there is no conflict, server scheduling tool 125 proceeds to step 340. Additionally, after server scheduling tool 125 receives responses from the client devices, server scheduling tool 125 proceeds to step 340. In step 340, server scheduling tool 125 determines a first execution time for the first job. If there is no conflict, server scheduling tool 125 can schedule the first job at an originally requested time in the first list of jobs. If there was a conflict, server scheduling tool 125 can schedule the first job at a proposed first time.

Server scheduling tool 125 then determines a second execution time for the second job in step 345. If there was no conflict, server scheduling tool 125 can determine that the second execution time is an originally requested time in the second list of jobs. If there is a conflict, server scheduling tool 125 can determine that the second execution time is a proposed second time for the second job.

Server scheduling tool 125 then assigns the first permission identifier to the first job in step 350. In step 355, server scheduling tool 125 assigns a second permission identifier to the second job. By assigning permission identifiers to the jobs, server scheduling tool 125 ensures that unscheduled jobs are not performed by the server. In step 360, server scheduling tool 125 communicates a schedule to the clients. The schedule indicates the scheduled times for each job along with their assigned permission identifiers.

Modifications, additions, or omissions may be made to method 300 depicted in FIG. 3. Method 300 may include more, fewer, or other steps. For example, steps may be performed in parallel or in any suitable order. While discussed as server scheduling tool 125 (or components thereof) performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A server scheduling tool comprising:
   a memory configured to store one or more scheduling histories; and
   a hardware processor communicatively coupled to the memory, the hardware processor configured to:
   receive a first list from a first client device, the first list comprising a first job;
   receive a second list from a second client device, the second list comprising a second job;
   calculate, based on the one or more scheduling histories, a first resource requirement to execute the first job;
   calculate, based on the one or more scheduling histories, a second resource requirement to execute the second job;
   determine, based on the first resource requirement and the second resource requirement, that a conflict exists between the first job and the second job;
   in response to the determination that the conflict exists:
   communicate a first message to the first client device indicating the conflict and a first proposed time for executing the first job; and
   communicate a second message to the second client device indicating the conflict and a second proposed time for executing the second job;
   determine based on responses to the first message and the second message a first execution time for the first job and a second execution time for the second job;
   assign a first permission identifier to the first job;
   assign a second permission identifier to the second job; and
   communicate a schedule indicating that the first job will execute at the first execution time, that the second job will execute at the second execution time, that the first job is assigned the first permission identifier, and that the second job is assigned the second permission identifier.

2. The server scheduling tool of claim 1, wherein the hardware processor is further configured to:

determine, based on a third resource requirement for a third job and a fourth resource requirement for a fourth job, that a second conflict exists between the third job and the fourth job; and request, from a cloud service, additional resources to execute the third job and the fourth job.

3. The server scheduling tool of claim 1, wherein the responses to the first message and the second message indicate that one or more of the first proposed time and the second proposed time were accepted.

4. The server scheduling tool of claim 1, wherein the hardware processor is further configured to:
before the first execution time, receive a first request to execute the first job;
determine that the first request does not include the first permission identifier;
in response to the determination that the first request does not include the first permission identifier, deny the first request;
before the second execution time, receive a second request to execute the second job;
determine that the second request includes the second permission identifier; and
in response to the determination that the second request includes the second permission identifier, grant the second request.

5. The server scheduling tool of claim 1, wherein the hardware processor is further configured to:
before the first execution time, receive, from the first client device, a request to validate that the first resource requirement is met; and
before the second execution time, receive, from the second client device, a request to validate that the second resource requirement is met.

6. The server scheduling tool of claim 1, wherein the hardware processor is further configured to:
determine that an emergency occurred during execution of the first job; and
in response to the determination that the emergency occurred, communicate a suspension message to the first client device and the second client device, the suspension message instructing the second client device not to request execution of the second job at the second execution time.

7. The server scheduling tool of claim 1, wherein the hardware processor is further configured to:
determine a first priority for a third job;
determine a second priority for a fourth job; and
determine, based on the first priority and the second priority, a third execution time for the third job and a fourth execution time for the fourth job.

8. A method comprising:
storing, by a memory, one or more scheduling histories;
receiving, by a hardware processor communicatively coupled to the memory, a first list from a first client device, the first list comprising a first job;
receiving, by the hardware processor, a second list from a second client device, the second list comprising a second job;
calculating, by the hardware processor, based on the one or more scheduling histories, a first resource requirement to execute the first job;
calculating, by the hardware processor, based on the one or more scheduling histories, a second resource requirement to execute the second job;

determining, by the hardware processor, based on the first resource requirement and the second resource requirement, that a conflict exists between the first job and the second job;
in response to the determination that the conflict exists:
communicating, by the hardware processor, a first message to the first client device indicating the conflict and a first proposed time for executing the first job;
communicating, by the hardware processor, a second message to the second client device indicating the conflict and a second proposed time for executing the second job;
determining, by the hardware processor, based on responses to the first message and the second message a first execution time for the first job and a second execution time for the second job;
assigning, by the hardware processor, a first permission identifier to the first job;
assigning, by the hardware processor, a second permission identifier to the second job; and
communicating, by the hardware processor, a schedule indicating that the first job will execute at the first execution time, that the second job will execute at the second execution time, that the first job is assigned the first permission identifier, and that the second job is assigned the second permission identifier.

9. The method of claim 8, further comprising:
determining, by the hardware processor, based on a third resource requirement for a third job and a fourth resource requirement for a fourth job, that a second conflict exists between the third job and the fourth job; and
requesting, by the hardware processor, from a cloud service, additional resources to execute the third job and the fourth job.

10. The method of claim 8, wherein the responses to the first message and the second message indicate that one or more of the first proposed time and the second proposed time were accepted.

11. The method of claim 8, further comprising:
before the first execution time, receiving a first request to execute the first job;
determining that the first request does not include the first permission identifier;
in response to the determination that the first request does not include the first permission identifier, denying the first request;
before the second execution time, receiving a second request to execute the second job;
determining that the second request includes the second permission identifier; and
in response to the determination that the second request includes the second permission identifier, granting the second request.

12. The method of claim 8, further comprising:
before the first execution time, receiving, from the first client device, a request to validate that the first resource requirement is met; and
before the second execution time, receiving, from the second client device, a request to validate that the second resource requirement is met.

13. The method of claim 8, further comprising:
determining that an emergency occurred during execution of the first job; and
in response to the determination that the emergency occurred, communicating a suspension message to the first client device and the second client device, the suspension message instructing the second client device not to request execution of the second job at the second execution time.

14. The method of claim 8, further comprising:
determining a first priority for a third job;
determining a second priority for a fourth job; and
determining, based on the first priority and the second priority, a third execution time for the third job and a fourth execution time for the fourth job.

15. A system comprising:
a first client device;
a second client device; and
a server scheduling tool comprising a memory that stores one or more scheduling histories and a processor configured to:
receive a first list from the first client device, the first list comprising a first job;
receive a second list from the second client device, the second list comprising a second job;
calculate, based on the one or more scheduling histories, a first resource requirement to execute the first job;
calculate, based on the one or more scheduling histories, a second resource requirement to execute the second job;
determine, based on the first resource requirement and the second resource requirement, that a conflict exists between the first job and the second job;
in response to the determination that the conflict exists:
communicate a first message to the first client device indicating the conflict and a first proposed time for executing the first job; and
communicate a second message to the second client device indicating the conflict and a second proposed time for executing the second job;
determine based on responses to the first message and the second message a first execution time for the first job and a second execution time for the second job;
assign a first permission identifier to the first job;
assign a second permission identifier to the second job; and
communicate a schedule indicating that the first job will execute at the first execution time, that the second job will execute at the second execution time, that the first job is assigned the first permission identifier, and that the second job is assigned the second permission identifier.

16. The system of claim 15, wherein the processor of the server scheduling tool is further configured to:
determine, based on a third resource requirement for a third job and a fourth resource requirement for a fourth job, that a second conflict exists between the third job and the fourth job; and
request, from a cloud service, additional resources to execute the third job and the fourth job.

17. The system of claim 15, wherein the responses to the first message and the second message indicate that one or more of the first proposed time and the second proposed time were accepted.

18. The system of claim 15, wherein the processor of the server scheduling tool is further configured to:
before the first execution time, receive a first request to execute the first job;
determine that the first request does not include the first permission identifier;
in response to the determination that the first request does not include the first permission identifier, deny the first request;
before the second execution time, receive a second request to execute the second job;
determine that the second request includes the second permission identifier; and
in response to the determination that the second request includes the second permission identifier, grant the second request.

19. The system of claim 15, wherein the processor of the server scheduling tool is further configured to:
before the first execution time, receive, from the first client device, a request to validate that the first resource requirement is met; and
before the second execution time, receive, from the second client device, a request to validate that the second resource requirement is met.

20. The system of claim 15, wherein the processor of the server scheduling tool is further configured to:
determine that an emergency occurred during execution of the first job; and
in response to the determination that the emergency occurred, communicate a suspension message to the first client device and the second client device, the suspension message instructing the second client device not to request execution of the second job at the second execution time.

21. The system of claim 15, wherein the processor of the server scheduling tool is further configured to:
determine a first priority for a third job;
determine a second priority for a fourth job; and
determine, based on the first priority and the second priority, a third execution time for the third job and a fourth execution time for the fourth job.

* * * * *